(12) United States Patent
Salter et al.

(10) Patent No.: US 11,110,800 B2
(45) Date of Patent: Sep. 7, 2021

(54) METHOD FOR AUXILIARY LOAD CONTROL

(71) Applicant: Ford Global Technologies, LLC, Dearborn, MI (US)

(72) Inventors: Stuart Salter, White Lake, MI (US); Ross Dykstra Pursifull, Dearborn, MI (US); Paul Kenneth Dellock, Northville, MI (US); David Brian Glickman, Southfield, MI (US); William Taylor, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 16/375,291

(22) Filed: Apr. 4, 2019

(65) Prior Publication Data

US 2020/0317057 A1     Oct. 8, 2020

(51) Int. Cl.
*B60L 1/00*     (2006.01)
*B60K 6/26*     (2007.10)

(52) U.S. Cl.
CPC ............ *B60L 1/006* (2013.01); *B60K 6/26* (2013.01)

(58) Field of Classification Search
CPC combination set(s) only.
See application file for complete search history.

(56) References Cited

U.S. PATENT DOCUMENTS

| | | | |
|---|---|---|---|
| 3,621,370 A | 11/1971 | Vandervort | |
| 4,099,067 A | 7/1978 | Szentes et al. | |
| 5,555,722 A * | 9/1996 | Mehr-Ayin | F02C 7/32 60/788 |
| 6,014,015 A | 1/2000 | Thorne et al. | |
| 6,828,755 B1 * | 12/2004 | Iverson | H01M 10/6563 320/104 |
| 7,024,859 B2 | 4/2006 | Jayabalan et al. | |
| 7,231,994 B2 | 6/2007 | Buglione et al. | |
| 7,347,168 B2 | 3/2008 | Reckels et al. | |
| 7,420,292 B2 * | 9/2008 | Busdiecker | H02J 1/14 307/11 |
| 7,503,871 B2 * | 3/2009 | Kozarekar | B60L 15/20 477/3 |
| 9,358,866 B2 * | 6/2016 | Hartz | B60K 6/22 |
| 9,466,198 B2 * | 10/2016 | Burch | G06Q 10/087 |
| 10,144,083 B2 * | 12/2018 | Radtke | B23K 9/1075 |
| 2005/0109550 A1 * | 5/2005 | Buglione | B60K 6/26 180/65.25 |
| 2005/0167090 A1 | 8/2005 | Kennedy | |
| 2007/0241614 A1 * | 10/2007 | Busdiecker | H02J 1/14 307/10.1 |
| 2008/0224663 A1 * | 9/2008 | Mack | H02J 7/1438 320/132 |
| 2009/0018702 A1 | 1/2009 | Oakes | |
| 2009/0294191 A1 | 12/2009 | Sheidler et al. | |
| 2010/0100306 A1 | 4/2010 | Gamache et al. | |

(Continued)

*Primary Examiner* — Adam D Houston
(74) *Attorney, Agent, or Firm* — Geoffrey Brumbaugh; McCoy Russell LLP

(57) ABSTRACT

Methods and systems are provided for controlling power generation in a vehicle. In one example, the vehicle includes a controller coupled to an auxiliary device through a communication link, the auxiliary device drawing power from a generator at a power interface. Power supplied to the auxiliary device is regulated by the controller through signals transmitted over the communication link.

20 Claims, 8 Drawing Sheets

(56) References Cited

U.S. PATENT DOCUMENTS

| | | | |
|---|---|---|---|
| 2010/0187029 A1* | 7/2010 | Young | B60K 6/46 180/65.31 |
| 2010/0301809 A1* | 12/2010 | Bhade | B60L 53/68 320/148 |
| 2011/0227340 A1* | 9/2011 | Rozman | H02P 27/04 290/31 |
| 2012/0013323 A1* | 1/2012 | Kenney | H02M 1/08 323/285 |
| 2012/0186888 A1* | 7/2012 | Ross | H02P 6/04 180/65.31 |
| 2012/0271498 A1* | 10/2012 | Kobayashi | B60W 10/02 701/22 |
| 2013/0181516 A1* | 7/2013 | Phan | H02J 7/14 307/10.7 |
| 2014/0240902 A1* | 8/2014 | Burch | H02B 11/26 361/626 |
| 2016/0032703 A1* | 2/2016 | Broussard | E21B 43/26 166/250.01 |
| 2016/0163186 A1* | 6/2016 | Davidson | G06Q 10/0635 340/506 |
| 2017/0070090 A1* | 3/2017 | Miller | H01R 13/6683 |
| 2017/0133842 A1* | 5/2017 | Freeman | H02J 1/00 |
| 2019/0222526 A1* | 7/2019 | Edwards | H04L 69/28 |
| 2019/0270382 A1* | 9/2019 | Pfizenmaier | H02H 3/40 |
| 2019/0303729 A1* | 10/2019 | Gramenos | G06K 9/00832 |
| 2019/0337394 A1* | 11/2019 | Butash | B60L 50/15 |
| 2019/0372358 A1* | 12/2019 | Markhi | H02J 7/00714 |
| 2020/0014206 A1* | 1/2020 | Haartsen | H01R 13/6683 |
| 2020/0086743 A1* | 3/2020 | Jala | H02H 3/025 |
| 2020/0108819 A1* | 4/2020 | Revach | B60W 20/13 |
| 2020/0112163 A1* | 4/2020 | Revach | B60L 50/51 |
| 2020/0254991 A1* | 8/2020 | Jungaberle | B60K 6/38 |
| 2020/0288218 A1* | 9/2020 | Cates | H04Q 9/00 |
| 2020/0317057 A1* | 10/2020 | Salter | B60L 1/006 |
| 2020/0318537 A1* | 10/2020 | Salter | F01P 11/14 |

* cited by examiner

METHOD FOR AUXILIARY LOAD CONTROL

FIELD

The present description relates generally to methods and systems for controlling a power load supplied to an auxiliary device from a vehicle.

BACKGROUND/SUMMARY

In addition to energizing vehicle motion, a power generation system of a vehicle may be used to operate auxiliary devices coupled to power outlets of the vehicle. For example, vehicle engines may be powered by large motor/generators, such as an integrated starter generator (ISG), rather than a conventional alternator. In particular, the ISG of utility vehicles such as trucks may be used to power auxiliary electrical devices in addition to vehicle propulsion. In certain vehicles, power tools may be electrically coupled to the ISG to enable use of the power tools when the truck is in a parked mode. For example, as shown by Buglione et al. in U.S. 2005/0109550, a vehicle may have at least one electrical outlet configured to deliver power to an auxiliary load. The vehicle may be adjusted to a stationary, power generating mode when auxiliary loads are coupled to the vehicle's power system at a power output panel. The power panel may be configured to automatically initiate arrangement of the vehicle in an operating state suitable for supplying power to the power output panel by varying a position of the panel to provide access to the panel, or, alternatively, the panel position may be adjusted by a manually operated switch. The power output panel includes a circuit breaker panel to equip outlets of the panel with ground fault interruption. A control module of the vehicle may determine appropriate conditions and adjustments to be made before power supply to the auxiliary load is enabled. The control module may monitor output voltage and display messages accordingly as well as indicate to an operator if a vehicle generator supplying power to the auxiliary load is operating properly or if malfunction is detected, to terminate power supply to the power panel.

However, the inventors herein have recognized potential issues with such systems. As one example, increasing power demands for auxiliary devices may drive reconfiguration of how power generation and allocation is controlled while a vehicle is in a stationary mode. For example, powering of devices such as power tools with high energy consumption increases electric power demand on the vehicle's generator causing the circuit breaker at the power panel to trip, in certain instances. Unexpectedly tripping the panel's circuit breaker results in large voltage spikes at the power panel. These voltage spikes, in turn, can cause damage to components in the vehicle's electric system, such as the generator, auxiliary devices, etc. Furthermore, manually resetting of the circuit breakers may be demanded before operation of the one or more auxiliary devices may be resumed, delaying use of the auxiliary devices and prolonging a period of time to complete tasks performed by the auxiliary devices.

In one example, the issues described above may be at least partially addressed by a method for operating a vehicle system with an internal combustion engine. The method includes establishing a communication link between the controller and an auxiliary device electrically coupled to a power interface of the vehicle. The method further includes receiving a signal from the auxiliary device indicative of an anticipated power consumption of the auxiliary device. The method additionally includes regulating power supplied to the auxiliary device through the power interface based on the signal indicative of the anticipated power consumption. In this way, anticipated electrical power flow between a power supply and an auxiliary device may be communicated to the controller through a communication link. In turn, the anticipated electric power flow is used to adjust an amount of electric power flowing to the auxiliary device to, for example, reduce the likelihood of a circuit tripping in the power interface or mitigate the negative impacts of tripping the circuit breaker.

As one example, the auxiliary device may be communicatively coupled to a PCM included in the controller via a communication link. A status of the auxiliary device, with regard to load tolerances, and a status of an engine system, with regard to power supply and engine operations, may be relayed by the communication link and used to adjust power delivery to the auxiliary device and provide alerts and notifications to an operator. Continuous updating may be provided via the communication link between the auxiliary device and the PCM, in some instances. For example, when an expected current flow drawn through a power interface of the vehicle by the auxiliary device approaches a breaker tripping threshold, outlets in the power panel coupled to the auxiliary device and other auxiliary devices may be shutdown according to a priority ranking when it is determined that the power draw of the auxiliary devices from the power interface is expected to overload the interface. In this way, operation of the auxiliary devices may be prioritized to better suit a user's needs.

Additionally, in one example, the controller may also reset the circuit breaker after the breaker is tripped and the auxiliary device communicates to the controller through the communication link that a motor in the auxiliary device has turned off. In this way, the circuit breaker may be quickly reset when it is known that the auxiliary device has been turned off. Additionally, automatically resetting the circuit breaker, also provides more continuous operation of the auxiliary device and less time is consumed when resetting the breaker.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling power generation and supply between a generator and an auxiliary device. In one example, efficient use of power supplied by a motor/generator to the auxiliary devices may be enabled by adapting the vehicle with a system allowing the vehicle's controller, which may include a powertrain control module (PCM), to communicate with power outlets delivering power from the generator at a power interface of the vehicle and to control circuit breakers at the power outlets. The power outlets may be equipped with wireless transmission devices, such as antennae, to relay information about an electrical status of the outlets and breakers to the controller. Alternatively, the power outlets may communicate with the controller via power line communication (PLC). In turn, the controller may command adjustments to current flow to the power outlets to reduce a likelihood of current overload that may trip the circuit breakers and disconnect the auxiliary devices. Thus, if desired, the auxiliary devices may be automatically matched, or paired, with the power outlets via a communication system or link and allow powering of the auxiliary devices to be monitored by the controller. By configuring the vehicle with the communication link, engine operations and conditions such as fuel consumption and engine temperature may be monitored by the controller and adjusted according to power usage at the power outlets to prolong power supply from the generator. Furthermore, the controller may command resetting of the circuit breakers when the circuit breakers are tripped and notify an operator of a status of the vehicle electrical system during auxiliary device use. In this way, vehicle issues related to electrical energization of devices may be readily communicated and resolved more rapidly while an amount of time consumed by the operator manually resetting disconnected circuit breakers is reduced.

Figure 1:
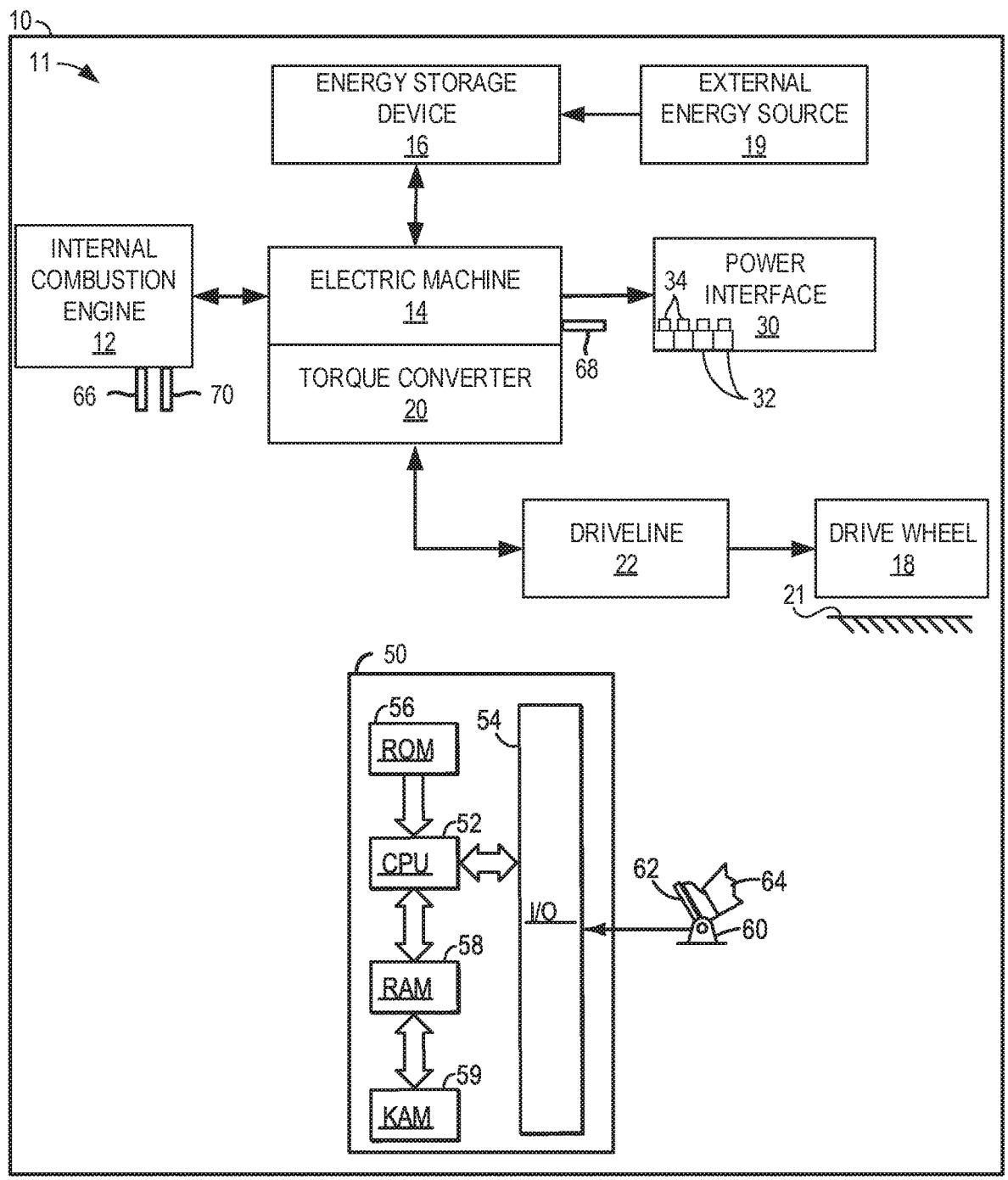
FIG. 1 shows an example powertrain in a vehicle that may be configured to power auxiliary devices.
Figure 2:
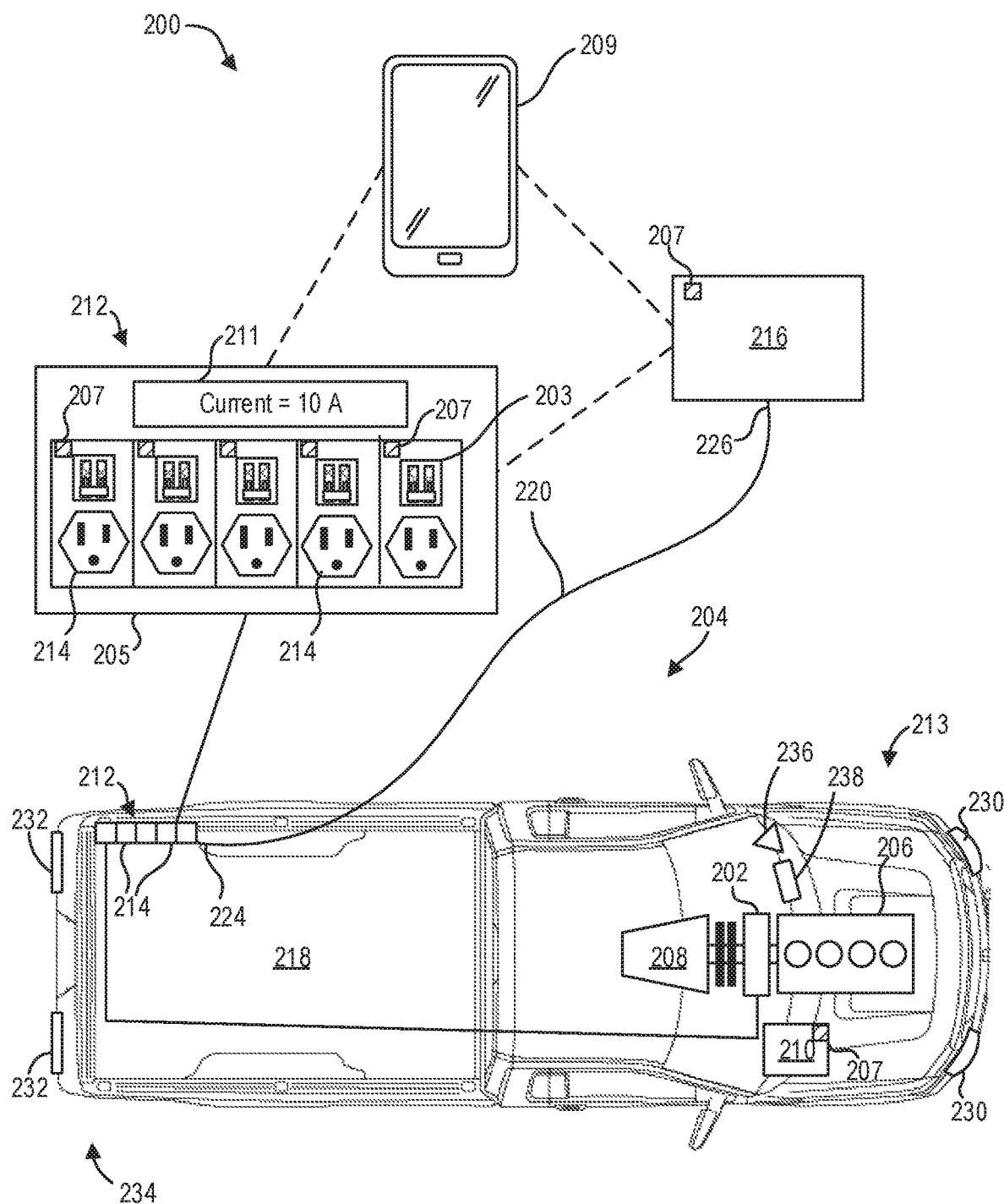
FIG. 2 shows a schematic diagram of an example of a vehicle with an integrated starter generator delivering electrical power to an auxiliary device.
Figure 3:
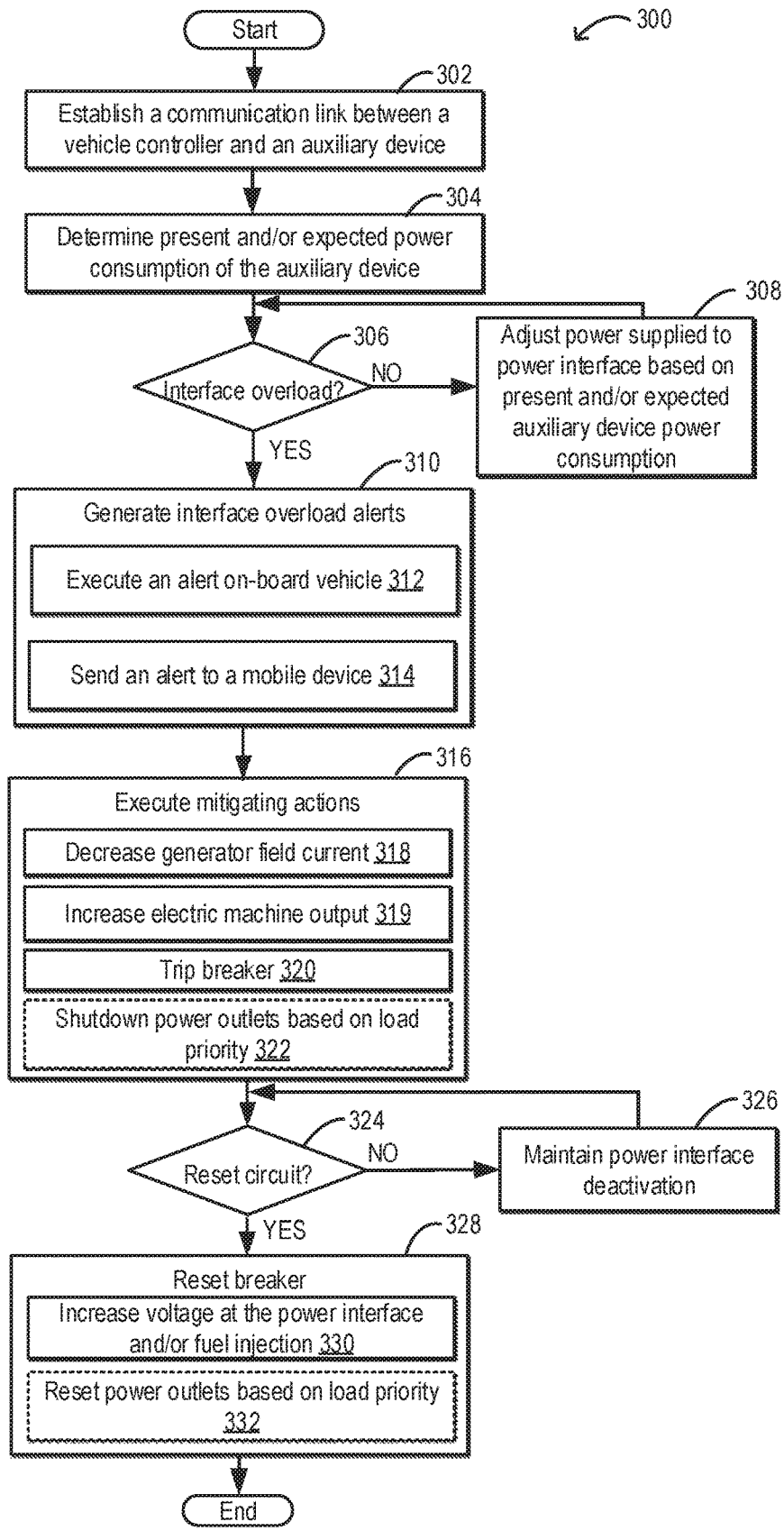
FIG. 3 shows an example of a high level method for controlling electrical loads in a vehicle while delivering power to auxiliary devices coupled to a power interface of the vehicle.

The generator may be included in a vehicle powertrain, such as the powertrain shown in FIG. 1, used to recharge a vehicle traction battery as well as power operation of auxiliary devices. An auxiliary device is depicted in FIG. 2 coupled to the powertrain to draw power from the generator. The auxiliary device may be configured to communicate with a controller of the vehicle, including, for example, a PCM, through a communication link. The PCM may receive updates about a status of the auxiliary device and command adjustments to power supply and to other vehicle systems coupled to the powertrain. The PCM may also indicate statuses and events to an operator based on information transmitted via the communication link. An example of a method for exchanging information between the PCM and the auxiliary device and adjusting engine operations in response to signals transmitted over the communication link is shown in FIG. 3. Details as to power allocation and modification during power delivery to the auxiliary device are depicted in an example method shown in FIG. 4 and continued in FIG. 5. An example of a method for resetting a circuit breaker that has been tripped due to current overload at a power interface of the vehicle in shown in FIG. 6. A flow of signals between the PCM, auxiliary device, and a mobile device, connected by the communication link, is illustrated in a flowchart in FIG. 7. Variations and adjustments in engine operations, including electrical status at a power outlet of the power interface, during auxiliary device usage is shown in a use-case example map illustrated in FIG. 8.

FIG. 2 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, the figure schematically depicts a vehicle 10 with a propulsion system 11 (e.g., hybrid propulsion system). Propulsion system 11 includes an internal combustion engine 12. The internal combustion engine 12 is coupled to an electric machine 14 (e.g., energy conversion device).

The electric machine 14 is further shown coupled to an energy storage device 16, which may include a battery, a capacitor, a flywheel, a pressure vessel, etc. The electric machine 14 can be operated to absorb energy from vehicle motion and/or the engine and convert the absorbed energy to an energy form suitable for storage by the energy storage device (e.g., provide a generator operation). The electric machine 14 can also be operated to supply an output (power, work, torque, speed, etc.,) to drive wheels 18 and/or engine 12 (e.g., provide a motor operation). It should be appreciated that the electric machine 14 may, in some embodiments, function only as a motor, only as a generator, or both a motor and generator, among various other components used for providing the appropriate conversion of energy between the energy storage device and the vehicle drive wheels and/or engine. For instance, the electric machine 14 may include a motor, a generator, integrated starter generator, starter alternator, among others and combinations thereof. The electric machine 14 may also include or be coupled to an inverter. The inverter may be configured to condition electrical energy in and out of the energy storage device (e.g., high voltage battery). However, in other examples, the vehicle may not include an inverter.

The electric machine 14 may include one or more clutches designed to selectively rotationally couple the machine's rotor to a crankshaft (not shown) of the engine 12 and/or the torque converter 20. For instance, the clutch or clutches may each include plates, splines, and/or other suitable mechanical components allowing the machine to be rotationally connected as well as disconnected from the engine or the torque converter.

The energy storage device 16 may be selectively coupled to an external energy source 19. For example, the energy storage device 16 device may be periodically coupled to a charging station (e.g., commercial or residential charging station), portable energy storage device, etc., to allow the energy storage device 16 to be recharged.

The electric machine 14 is coupled to a torque converter 20. The torque converter 20 is a fluid coupling designed to transfer rotational input from the electric machine 14 and/or the internal combustion engine 12 to a driveline 22. The driveline 22 includes a transmission with gearing and other suitable mechanical components designed to transfer rotational motion to the drive wheels 18. The mechanical components may include a gearbox, axles, transfer cases, etc., for example. The torque converter 20 and the electric machine 14 are depicted as an interconnected unit. However, in other examples, the torque converter and the electric machine may include discrete enclosures.

In one example, a crankshaft of the engine may be coupled to an input of the electric machine and a shaft of the torque converter 20 may be attached to a transmission input. However, other driveline designs have been contemplated.

The depicted connections between engine 12, electric machine 14, driveline 22, and drive wheel 18 indicate transmission of mechanical energy from one component to another, whereas the connections between the electric machine 14 and the energy storage device 16 may indicate transmission of a variety of energy forms such as electrical, mechanical, etc. For example, torque may be transmitted from the electric machine 14 to drive the vehicle drive wheels 18 via the driveline 22. As described above, the electric machine 14 may be configured to operate in a generator mode and/or a motor mode. In a generator mode, system 11 absorbs some or all of the output from engine 12 and/or electric machine 14, which reduces the amount of drive output delivered to the drive wheel 18, or the amount of braking torque to the drive wheel 18. Such operation may be employed, for example, to achieve efficiency gains through regenerative braking, increased engine efficiency, etc. Further, the output received by the electric machine may be used to charge an energy storage device 16. In motor mode, the electric machine 14 may supply mechanical output to the driveline 22, for example by using electrical energy stored in an electric battery. Additionally, the engine 12 may supply rotational output to the driveline 22 during the motor mode, in some instances.

The electric machine 14 may also be used to deliver electrical energy to external, auxiliary devices during power take-off. The engine 12 may run during power take-off but the drive wheels 18 are not in motion, allowing power output from the engine 12 and electric machine to be directed at least partially towards operating the auxiliary devices. The vehicle 10 may include a power interface 30 arranged along an electrical circuit of the vehicle 10. The power interface may have a plurality of power outlets 32, each outlet electrically coupled to the electric machine, and plugging the auxiliary devices into the plurality of outlets allows power to be supplied to the auxiliary devices. Each of the power outlets 32 are coupled to or have a circuit breaker 34 integrated therein. The arrow extending between the electric machine 14 and the power interface 30 indicates the transfer of electrical energy therebetween. Further details of the power interface are described below, with reference to FIG. 2.

Hybrid propulsion embodiments may include full hybrid systems, in which the vehicle can run on just the engine, just the electric machine (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components, described above with reference to FIG. 1, may be controlled by a controller 50, described in greater detail herein.

From the above, it should be understood that the exemplary hybrid propulsion system is capable of various modes of operation. In a full hybrid implementation, for example, the propulsion system may operate using electric machine 14 as the only torque source propelling the vehicle. This "electric only" mode of operation may be employed during braking, low speeds, while stopped at traffic lights, etc. In another mode, engine 12 is turned on, and acts as the only torque source powering drive wheel 18 on a drive surface 21. In still another mode, which may be referred to as an "assist" mode, the electric machine 14 may supplement and act in cooperation with the torque provided by engine 12. As indicated above, electric machine 14 may also operate in a generator mode, in which torque is absorbed from engine 12 and/or driveline 22. Furthermore, electric machine 14 may act to augment or absorb torque during transitions of engine 12 between different combustion modes (e.g., during transitions between a spark ignition mode and a compression ignition mode).

FIG. 1 also shows a controller 50 in the vehicle 10. The controller 50 receives signals from the various sensors of FIG. 1 and employs the various actuators of FIG. 1 to adjust vehicle operation based on the received signals and instructions stored in non-transitory memory of the controller. The electric machine, shown in FIG. 2 as an integrated starter generator, may also be controlled by the controller 50. Specifically, controller 50 is shown in FIG. 1 as a conventional microcomputer including: microprocessor unit 52, input/output ports 54, read-only memory 56, random access memory 58, keep alive memory 59, and a conventional data bus. Controller 50 is configured to receive various signals from sensors coupled to the propulsion system 11 and send command signals to actuators in components in the vehicle, such as the electric machine 14. Additionally, the controller 50 is also configured to receive pedal position (PP) from a pedal position sensor 60 coupled to a pedal 62 actuated by an operator 64. Therefore, in one example, the controller 50 may receive a pedal position signal and adjust actuators in the electric machine 14 based the pedal position signal to vary the rotational output of the electric machine 14. It will be appreciated that other components receiving command signals from the controller may function in a similar manner such as the engine 12. The sensors communicating with the controller 50 may include exhaust gas sensor 66 to determine an exhaust gas air/fuel ratio, electric machine sensor 68 (e.g., resolver or hall effect sensor for sensing a rotor position of the electric machine), and engine temperature sensor 70, etc.

As described above, the electric machine 14 of FIG. 1 may be configured as an integrated starter generator (ISG) in some examples. An example of an ISG 202 is depicted in a schematic diagram 200 in FIG. 2, arranged in a vehicle 204. As one example, the ISG 202 may be the electric machine 14 and the vehicle 204 may be the vehicle 10 of FIG. 1. The ISG 202 may be arranged between an engine 206 and a transmission 208 in a front end 213 of the vehicle 204. The engine 206 similarly used as the internal combustion engine 12 of FIG. 1.

The vehicle 204 may also have a power interface 212 which may be disposed in a vehicle bed 218, as shown in FIG. 2. However, in other examples, the power interface 212 may be positioned in some other, accessible region of the vehicle 204. The power interface 212 includes an optional digital display 211 to display information about a status of the power interface 212, e.g., to indicate active power draw through the power interface 212, an overall current flow through the power interface 212, etc. The power interface 212 has a plurality of power outlets 214 configured to receive electrical plugs of electrical devices, such as an auxiliary device 216. The auxiliary device 216 may be coupled to one of the plurality of power outlets 214 by a power cable 220 that is plugged into the power outlet at a first end 224 and connected to the auxiliary device 216 at a second end 226. By plugging the auxiliary device 216 into one of the plurality of power outlets 214, power may be delivered to the auxiliary device 216 from the ISG 202. Although a single auxiliary device is shown plugged into the plurality of power outlets 214 in FIG. 2, other examples may include more than one auxiliary device coupled to the plurality of power outlets 214 and drawing power from the ISG 202.

Each of the plurality of power outlets 214 may be equipped with a circuit breaker 203, as shown in insert 205. The circuit breaker 203 may be adapted to interrupt electrical flow through each of the plurality of power outlets 214 when triggered by current flow through the power interface 212 rising above a threshold such as 30 or 40 amps. The circuit breaker 203, arranged in a closed position when the auxiliary device 216 is operating, may be tripped when the current level reaches the threshold and switched to an open position to cut off power supply to the associated outlet of the plurality of power outlets 214 and deactivate the auxiliary device 216. In order to restart the auxiliary device 216, the tripped circuit breaker is reset by switching the circuit breaker back to the closed position. The circuit breaker may be a transistor with current-sensing capability. Therefore, in such an example, the breaker may be manually reset via operator action and completed electronically.

The PCM 210 may be included, for example, in the controller 50 of FIG. 1. The PCM 210 receives information from sensors arranged in a powertrain of the vehicle 204 and sends instructions to actuators of the powertrain. For example, the PCM 210 may receive a signal from a resolver of the ISG 202 to infer a power output of the ISG 202 and command adjustment of ISG 202 output, e.g., field current, according to active engine operations and electrical loads. The PCM 210 may also control activation of vehicle accessories such as headlights 230, taillights 232, positioned at the front end 213 and a rear end 234 of the vehicle 204, respectively, a speaker or horn 236, and a cabin display panel 238. As such, illumination of the headlights 230 and taillights 232 may be enabled by the PCM 210 as well as emission of noises by the horn 236 and presentation of alerts and notifications at the cabin display panel 238.

The PCM 210 may also communicate with the power interface 212 and the auxiliary device 216 through a communication link. The communication link may be a wireless communication network, such as a Bluetooth low energy (BLE) network, allowing the PCM 210 to monitor electrical and operating statuses of power interface 212 and the auxiliary device 216 and adjust power output and engine operations in response to operating conditions at the power interface 212 and the auxiliary device 216. For example, the vehicle PCM 210, the plurality of power outlets 214, and the auxiliary device 216 may be equipped with BLE antennae 207, allowing communication between each of the components and between the PCM 210 and an external communication device, such as a mobile phone 209. In other examples, the communication link may be a wired communication link such as PLC communication link established via the electrical lines coupling the power outlet where the auxiliary device is attached to the PCM. The mobile phone 209 may be similarly adapted to connect to the controller via a communication link and may be controlled by the operator. The communication link established between the mobile phone 209 and the PCM 210 may be similar, in one example, to the communication link between the PCM and the auxiliary devices. However, in other examples, the communication links may be dissimilar. For instance, the PCM may establish a PLC communication link with the auxiliary devices and a wireless communication link with the mobile phone Each circuit breaker 203 at the plurality of power outlets 214 may be configured to disconnect one or more power take-off loads drawing power through the plurality of power outlets 214 when a set voltage of the ISG 202, supplying power to the power interface 212, drops to a brownout level. The brownout level may be an intentional drop to reduce load and decrease a likelihood of an electrical blackout (e.g., a power outage) or an unintentional effect of disruption of an electrical grid. Each circuit breaker 203 may also be tripped to disconnect one or more auxiliary devices, such as the auxiliary device 216, when an amount of current drawn by the one or more auxiliary devices exceeds a threshold current level of each circuit breaker 203. In conventional systems, in order to resume power flow to the auxiliary devices, each circuit breaker 203 may be manually reset. An amount of time for an operator to reach the tripped circuit breaker 203, which may be positioned a distance away from the auxiliary devices, reset at least one circuit breaker 203, and return to the auxiliary devices, may incur undesirable delays in task completion, particularly if the power interface 212 is repeatedly overloaded.

By adapting the powertrain and auxiliary device with wireless communication capabilities, such as the BLE antennae 207 of FIG. 2, current draw may be monitored and adjustments to the electrical loading on the powertrain may be executed in response to the information transmitted via the BLE network to reduce a likelihood that a high priority electrical load is disconnected. Disconnecting of electrical loads according to a priority ranking may, in certain circumstances, offset the vehicle's potentially limited ability to hold voltage and provide power at a desired level when compared to a scenario where the auxiliary devices are connected to the electrical grid. A PCM, e.g., the PCM 210 of FIG. 2, may automatically pair with an auxiliary device within a distance selected by an operator that is plugged into the vehicle power outlets, allowing the PCM to manage a field current and control circuit breakers at the power outlets during operation of the auxiliary device. For example, the amount of current drawn by the auxiliary device through one of the power outlets may be communicated to the PCM through the BLE network. The PCM utilizes the received information to command the field current flowing through the power outlet from an ISG, such as the ISG 202 of FIG. 2, to match a current draw of the auxiliary device.

The monitoring capability of the BLE network may be leveraged to adjust current flow when the current flow is detected to approach the threshold current level of the circuit breakers. In one example, the auxiliary device load may be disconnected when the device is beginning to stall and the current is anticipated to reach the threshold level, thereby precluding generation of a large voltage spike in the powertrain that occurs when a circuit breaker is tripped due to current overload. The PCM may instruct the ISG to reduce (e.g., cut) the field current to the auxiliary device before tripping the circuit breaker. A status of the auxiliary device and imminent increased likelihood of stall may be communicated to the PCM through the BLE network and reduction of the field current to, for example, a lower flow of current supplied to other power outlets. Reducing the field current may suppress generation of voltage spikes that may otherwise degrade electrical components in the powertrain.

The PCM may generate a message to notify an operator that the auxiliary device is disconnected. The message may be in the form of a graphical, audio, and/or haptic alert. For instance, an alphanumeric alert (e.g., error code), images, etc., for example, may be presented on a digital display (e.g., digital display 211 of FIG. 2) coupled to the power outlets. Alternatively or additionally, the PCM may communicate with an operator's handheld device, such as the mobile phone 209 of FIG. 2, that is also connected to the communication link to display a message indicating a status of the auxiliary device. In one example, the PCM may be configured to communicate with any BLE-capable mobile device within a 600 foot range of the PCM. Furthermore, generating the message at the PCM may include commanding the vehicle's lights to flash or activate a vehicle horn to indicate a disconnected load or problem supplying power.

In another example, multiple auxiliary devices, e.g., more than one, with some devices adapted with wireless communication capability (referred to as a smart device hereafter) and some without wireless communication capability (referred to as a dumb device hereafter), may be plugged into the power outlets of the vehicle. In one optional example, in response to a status of a smart device, communicated to the PCM via the BLE network, approaching a current threshold of the circuit breakers (e.g., auxiliary device stalling), the field current to the smart device may be decreased. A reduction in the field current to the first device may aid in reducing voltage spikes if a circuit breaker is tripped due to another auxiliary device, e.g., due to a dumb device.

In an event where one of the circuit breakers is tripped, e.g., by a smart or a dumb device, the tripped circuit breaker may be automatically reset as directed by the PCM. For example, the smart device may inform the PCM over the BLE network that the smart device is not receiving power and request resetting of the circuit breaker. The smart device may include a microprocessor with sufficient power storage to continue operating the smart device after power is cut off at the power outlet for a period time, such as 1, 2 or 5 minutes. This period of time may be longer in duration than an elapsed period of time for the circuit breaker to be reset, thereby enabling continuous operation of the smart device even when the circuit breaker is tripped.

If a dumb device draws a current overload and trips the circuit breaker, the PCM may interrogate the power interface, e.g., the power interface 212 of FIG. 2, also adapted with a BLE antenna, to infer a status of the dumb device at a power outlet to which the dumb device is coupled. Upon determining that the circuit breaker of the power outlet is tripped and no longer delivering power to the dumb device, the PCM may command resetting of the circuit breaker. Similar to the smart device, the dumb device may have sufficient energy storage capability within a device microprocessor to continue operating while the circuit breaker is tripped and not receiving power.

To reset a circuit breaker that has been tripped due to current overload, the PCM may instruct a voltage supplied by the ISG to be raised. For example, the voltage may be increased by 2% or 5%. Raising the voltage may circumvent voltage sags when the tripped circuit breaker is reset and a large electrical load is restarted. In addition, immediately prior to the breaker closing to be reset, the PCM may command increased fuel delivery to the engine intake to support the higher imposed load when the disconnected auxiliary device is restarted. An amount by which the fuel delivery is increase may be proportional to an anticipated elevation in load.

In some examples, resetting of the tripped circuit breaker may be performed automatically upon detection of a power cut to the circuit breaker. As such, the circuit breaker may be reset without prior notification indicated to the operator and conducted at a pre-set time interval. As an example, the time interval may be 1, 2, or 10 minutes or some period of time sufficient to allow an overheated auxiliary device to cool, allowing the device to draw a lower amount of current than if the auxiliary device is restarted at a higher temperature. The PCM may indicate to the operator when the circuit breaker is initially tripped and when the circuit breaker is reset by, for example, sending an alert to the operator's mobile device or commanding visual or audio signals to be initiated, such as the vehicle lights or horn.

Furthermore, the PCM may transmit additional information to the operator's mobile device during operation of auxiliary devices coupled to the vehicle power outlets, within an operator-selected range such as 600 feet, for example. The additional information may include engine coolant temperature (ECT) as detected by an ECT sensor, intake manifold temperature as measured by a temperature sensor or anticipated rise in temperature at the engine estimated based on current load, current levels generated and/or used, and inferred run time based on fuel usage and electrical loads. In addition, when a circuit breaker is tripped or an issue develops that inhibits resetting of the circuit breaker or restarting of the auxiliary device, the PCM may instruct the vehicle lights and/or horn to be activated in pulses as well as sending an alert to the operator's mobile device.

The PCM may also command disconnecting of electrical loads, including auxiliary devices and other power consuming systems such as air conditioning and electric vehicle charging, according to a priority ranking. The priority ranking may be determined by an operator, e.g., loads selected based on the operator's preference as to which loads are to be operated continuously. The loads may be ordered based on which power outlet each load is coupled to at the power interface where each power outlet is assigned a priority ranking. Alternatively, the operator may individually select priority ranking for each electrical load by, for example, indicating rankings on the BLE-capable mobile device. When a drop in voltage is detected at the power interface, due to auxiliary device stall, the PCM may instruct the power interface to being disconnected electrical loads beginning with a lowest priority ranked load. Additional loads, increasing in priority ranking, may be disconnected until anticipated power draw of the remaining connected loads is below the power threshold of the power interface. Thus operation of the highest priority load(s) is preserved. Restarting of devices may also follow the priority ranking, beginning with the highest ranked loads followed by increasingly lower ranked loads.

By maintaining continuous feedback to the PCM from the auxiliary devices and/or the power outlets, the operating statuses of the one or more auxiliary devices are monitored, allowing the PCM to adjust field current and engine operations in real-time. The wireless communication channels allows automatic pairing between the auxiliary devices and the power outlets with the PCM overseeing current delivery from the ISG to decrease field current in response to current draw of the auxiliary devices approaching a threshold level that trips the circuit breakers of the power outlets. The auxiliary devices are disconnected from power less frequently and voltage spikes and sags are reduced. When the circuit breakers are tripped, the circuit breakers may be reset as commanded by the PCM with adjustments to engine operations conducted concurrently to compensate for changes in ISG load. Notifications to alert an operator of events and statuses of the engine and auxiliary devices may be provided via the wireless communication channel.

Figure 4:
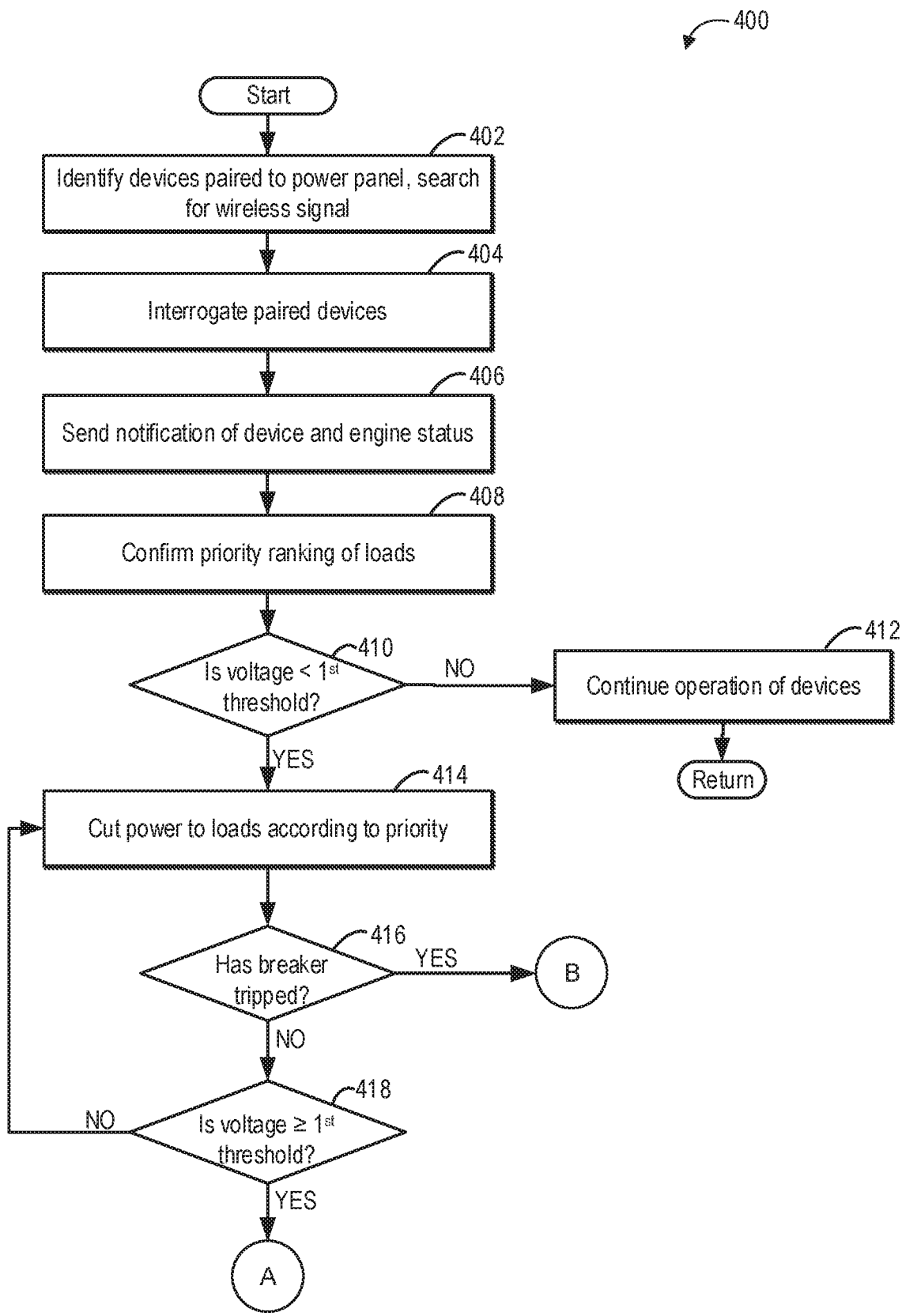
FIGS. 4-5 show an example of a method for monitoring power generation and distribution in a vehicle delivering power to auxiliary devices from an integrated starter generator.
Figure 5:
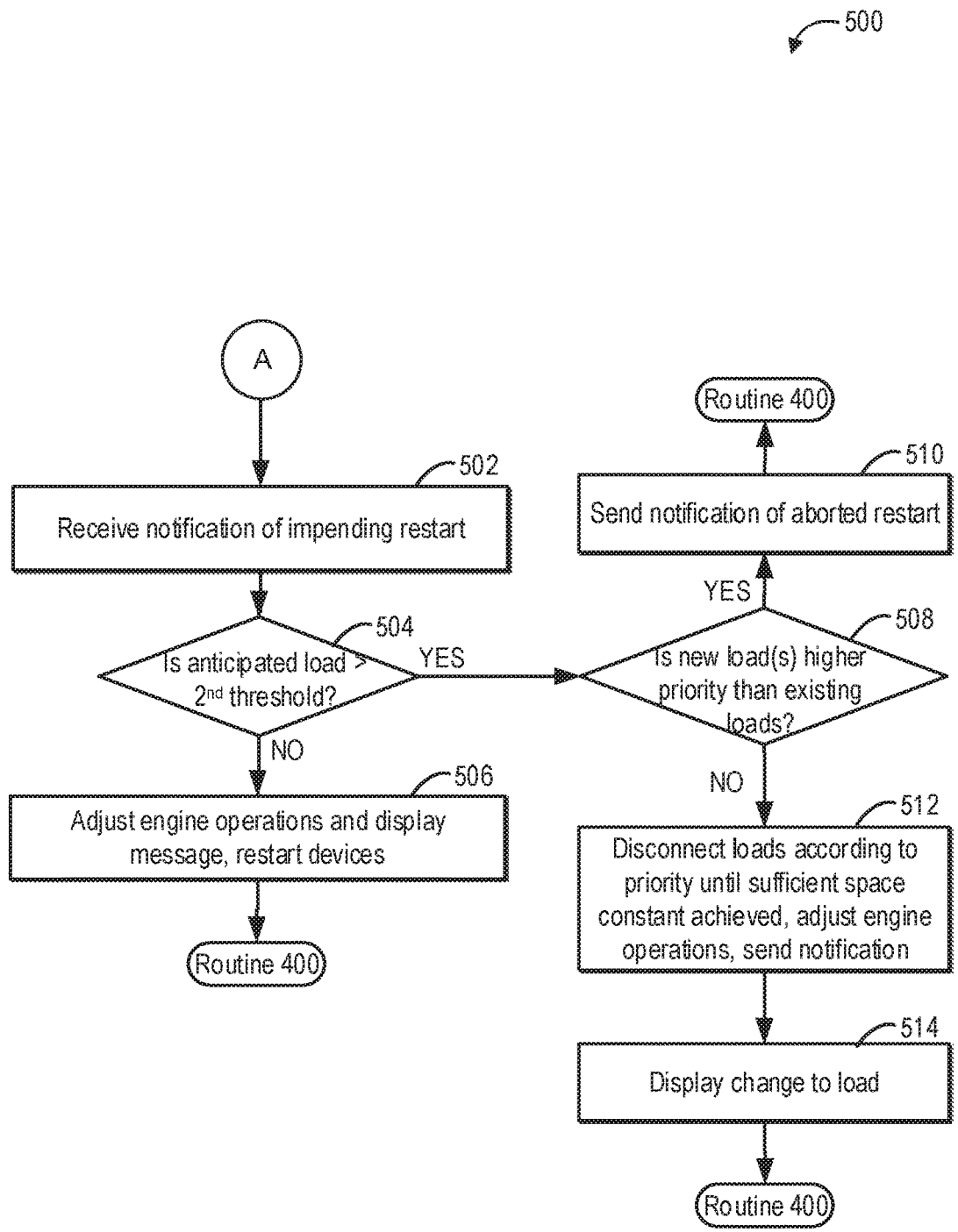
Figure 6:
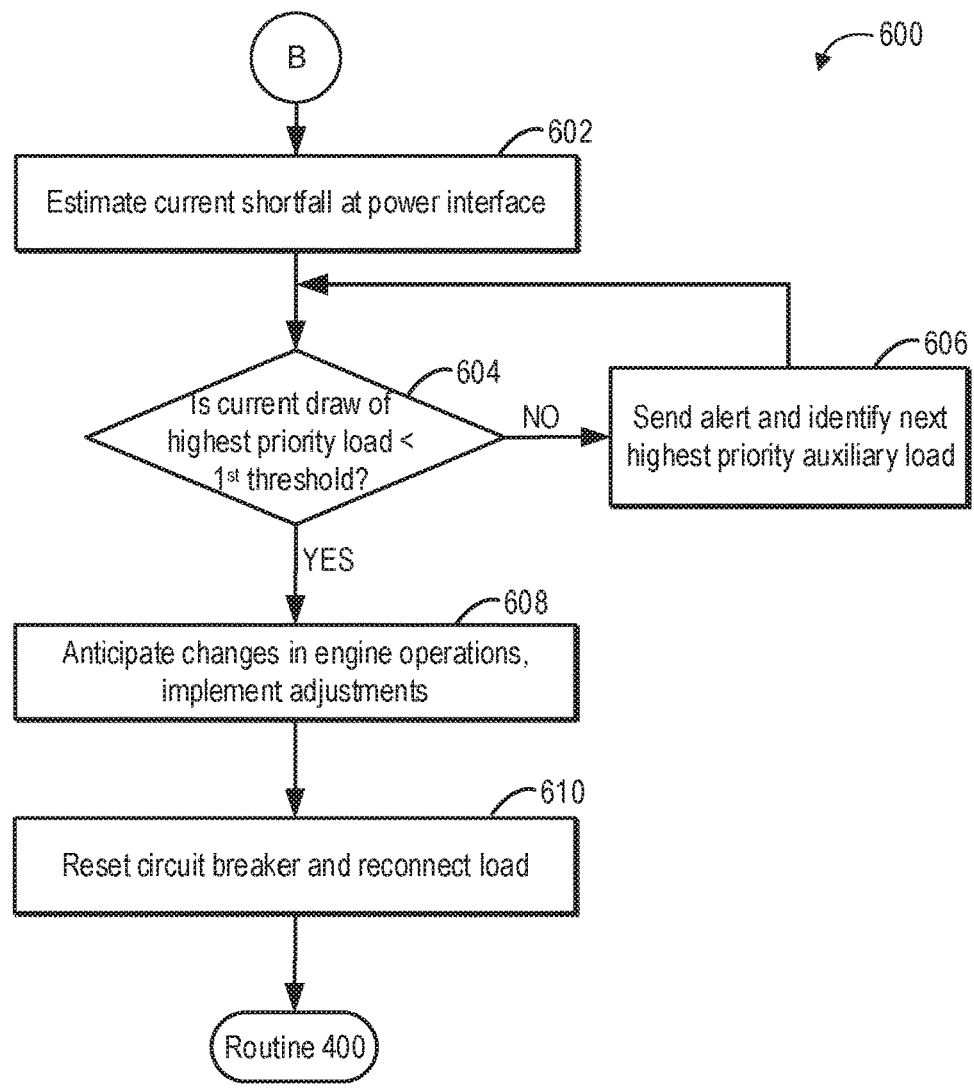
FIG. 6 continues from FIG. 4 and shows an example of a method for resetting circuit breakers that have been tripped due to overload at a power interface of the vehicle.

Implementation of a communication link in a vehicle configured to provide power to auxiliary, accessory devices and regulate power delivered from a generator, such as an ISG, to the auxiliary devices is shown in methods 300, 400, 500, and 600 in FIGS. 3-6, respectively. It will be appreciated that in some examples, the methods 300, 400, 500, and/or 600 may be implemented while the vehicle is not in motion (e.g., in a parked mode). Method 300 is a high level flowchart describing a general routine for adjusting power delivery and engine operations based on information obtained via the communication link while FIGS. 4-6 provide more detailed descriptions of the processes outlined in method 300. The vehicle may have a controller, such as a PCM, that receives data from various engine sensors, such as an ECT sensor measuring a coolant temperature, a fuel level sensor to monitor an amount of fuel in a fuel tank of the vehicle, and an exhaust gas sensor to measure an air fuel ratio (AFR) of the vehicle's engine system. The PCM may also receive signals via a communication link from components and accessories equipped with mechanisms for transmitting information. For example, a power interface of the vehicle may include antennae at each power outlet of the interface to relay information about current flow and voltage at each outlet. The auxiliary devices may be similarly equipped with antennae to inform the PCM of a status of each of the auxiliary devices when the auxiliary devices are coupled to the power interface as well as an indication of an anticipated amount of power consumed by each of the auxiliary devices. Instructions for carrying out method 300 and the rest of the methods included herein may be executed by the PCM based on instructions stored on a memory of the PCM and in conjunction with signals received from the sensors of the engine system. The PCM may employ engine actuators of the engine system to adjust engine operations, according to the methods described below.

At 302, the method includes establishing a communication link between the PCM and at least one of the auxiliary devices coupled to the power interface. The communication link may be a wireless communication network, such as BLE, and the PCM may be adapted with a device for transmitting and receiving BLE signals to and from components equipped with BLE antennae, such as the power outlets of the power panel and at least one of the coupled auxiliary devices. The auxiliary device may be automatically paired with the power outlet to which the auxiliary device is connected to so that the auxiliary device and power outlet are matched at a specific communication frequency and transmit signals to the PCM in a paired mode.

The PCM determines a current and/or expected power draw of the auxiliary device 304 based on a signal indicative of present and/or expected power consumption from the auxiliary device. The PCM determines at 306, based on information transmitted to the PCM from the auxiliary device, if a present and/or expected power interface overload is/will occur. In one example, a voltage sag may be indicative of interface overload. The voltage may sag due to a power demand exceeding power generation at a vehicle powertrain. If the interface overload is not detected, method 300 continues to 308 to adjust the power supplied to the power interface. For example, a flow of current to the power outlet may be increased or decreased based on the anticipated power consumption of the auxiliary device, depending on comparison of current flow at the power outlet, as communicated to the PCM by the BLE network, and the inferred amount of power used by the auxiliary device. The method then returns to 306 to determine if an interface overload is detected. If the power interface is determined to be overloaded or approaching overload, e.g., the current is stalled at the auxiliary device or increasing to within a threshold margin of current overload at a corresponding circuit breaker, the method proceeds to 310 to implement a power interface overload mitigation mode. As an example, a voltage drop and/or the electric machine reaching or surpassing a power limit may be indicative of a power interface overload or expected power interface overload.

Implementing the power interface overload mitigation mode includes generating alerts such as triggering an overload indicator in the vehicle at 312. The overload indicator may include various visual, audio, and/or haptic notifications such as activating a vehicle horn, flashing exterior vehicle lights (e.g., headlights), and/or illuminating a vehicle cabin console display specific to the overcurrent condition, for example. Generating overload alerts may also include sending an overload alert to an external device at 314, such as a mobile device, that is connected to the communication link and configured to communicate with the PCM. As an example, the PCM may command a message to be displayed on the mobile device to notify a user of the stalled auxiliary device.

At 316, the method includes continuing implementation of the power interface overload mitigation mode by performing mitigating actions. The generator field current may be decreased at 318, the electric machine output increased at 319, and/or a circuit breaker at the power outlet may be tripped to disconnect the auxiliary device from the generator at 320. Additionally or alternatively the power outlets may be deactivated based on a priority ranking at 322. One or more electrical loads may be connected to the power outlets, the loads including the auxiliary device and other power-consuming systems and devices, such as air conditioning, vehicle charging, etc. The priority ranking of the loads, as well as details of the mitigating actions are described further below with respect to FIGS. 4 and 5.

The PCM determines if the electrical circuit is to be reset at 324, based on whether the circuit breaker is tripped. If one or more circuit breakers are not tripped and the circuit is not reset, the method continues to 326 maintain the power interface in a deactivated state, e.g., the decreased generator field current, and deactivated power outlets. If the circuit is to be reset, the method proceeds to 328 to reset the circuit breaker(s). Resetting the circuit breaker(s) includes, at 330, increasing a voltage at the power interface by a predetermined amount and/or increasing an amount of fuel injection at the vehicle engine. The power outlets at the power interface may be reset, e.g., closed to reconnect the loads, in an order based on the priority ranking. Further details of resetting the circuit breaker(s) is provided below with respect to FIG. 6. Following resetting of the circuit breaker(s), the method ends.

Method 400, shown in FIG. 4, is an example of a routine for monitoring operation and a status of one or more loads, including auxiliary devices and systems connected electrically via interruptible configurations, drawing electrical energy from an ISG, such as the ISG 202 of FIG. 2, for a vehicle configured with a power interface to power the loads. As described above, a PCM, such as the PCM 210 of FIG. 2, communicates with the auxiliary devices and the power interface, each component equipped with a wireless communication mechanism, such as BLE antennas. Each of the auxiliary devices may inform the PCM of how much power the auxiliary device draws and each of the outlets may notify the PCM of when power is actively flowing through the power outlet as well as a level of current delivered therethrough. Upon plugging an auxiliary device into an outlet of the power panel, the auxiliary device and outlet may be automatically paired via a BLE network.

At 402, the method includes identifying auxiliary devices, as well as other electrical loads, coupled to the power interface and paired to the outlets of the power interface. The PCM may refer to a look up table listing BLE identification labels for specific auxiliary devices and search for the auxiliary devices within a pre-set triangulation range, such as, for example, within 600 feet of the PCM. Upon identifying the paired auxiliary devices, the PCM may interrogate the devices at 404 to determine a running current and a stall current for each of the auxiliary devices. The stall current may be a current drawn by a device when operation of the device is stopped by an opposing force (e.g., load torque is greater than motor torque) while the running current may be a current or range of currents drawn by the device during auxiliary device motor operation.

The PCM sends a message to a BLE-capable device, such as a mobile phone, within the triangulation range of the PCM at 406 to provide notification of auxiliary devices paired to the power interface, as well as a total running current or surge limit of the auxiliary devices. The PCM may compare the total running current to a maximum allowable running current or surge limit of the power interface. Information pertaining to measured engine conditions, such as ECT, current generation and usage at the ISG, as well as predicted changes in engine temperature and remaining run time based on current fuel consumption and loads, etc., may be included in the message to the mobile phone. Issues arising with fuel levels (e.g., low fuel levels), engine temperature (e.g., overheating), and/or other engine conditions and operations may be communicated by commanding the vehicle horn or lights to be activated or displaying an alert message on a cabin display panel or mobile phone.

In one example, an inrush current (also an input surge current or switch-on surge) produced instantaneously when an electrical device is activated, may be greater than a current drawn by the electrical device when the device is operating. In some examples, the inrush current may be up to six times greater than the operating current of the device. As such, in spite of an operating current of the device that is lower than a current threshold of a circuit breaker coupled to a power outlet energizing the device, the circuit breaker may be tripped due to the inrush current. As an option, the inrush current may be taken into account during the initial assessment of current generation and usage by the PCM. However, in other examples, the PCM may not take into account current inrush but rather shed loads according to a predetermined prioritization, as described below.

At 408, the PCM commands display of a priority ranking of the electrical loads connected to the vehicle powertrain actively drawing power from the powertrain. The priority ranking may be arranged according to current usage, e.g., ranked from highest current draw to lowest current draw. Some loads, such as air conditioning and electric vehicle charging, may be coupled to the powertrain through an interruptible power connection and ranked at a lower priority than loads connected via continuous connections. The priority ranking may be an order of load disconnection followed by the PCM when overloading voltage sag is detected. For example, when tripping of a circuit breaker is imminent, the PCM may disconnect electrical loads following the priority ranking, beginning with the lowest ranking load. In some examples, an operator may send instructions to the PCM to automatically turn lower priority auxiliary devices off when current draw approaches a threshold level. Alternatively, in other examples, the priority ranking may be selected and customized by an operator. As an example, a menu may be displayed on the mobile phone that allows the operator to assign priority according to preference. The PCM may refer to the operator-selected rankings over a priority ranking stored in a memory of the PCM. The priority ranking may also represent an order in which auxiliary device may be restarted. For example, the highest priority device may be restarted first to decrease (e.g., minimize) downtime of the highest priority device, followed by sequentially lower ranking auxiliary devices. Furthermore, in some examples, a smart auxiliary device may be configured to initiate self-disconnection if the smart auxiliary device is determined to be a cause of the voltage drop.

The method includes, at 410, determining if a voltage at the power panel drops below a first threshold. The first threshold may represent a loss of voltage indicating an approach of at least one circuit breaker tripping value. If the voltage does not drop below the first threshold, the method continues to 412 to continue operation of the electrical loads. The method then returns to the start. In this way, voltage drop at the interface may be tolerated for a time period (e.g., short time period) prior to the execution of overload mitigating actions, such as prioritized load shedding at the power interface.

If the voltage falls below the first threshold, the method proceeds to cut power to the electrical loads according to priority. For example, as described above, the loads may be disconnected beginning with a lowest ranking load and continue with sequentially higher ranking loads. At 416, the method includes determining if any of the circuit breakers of the power interface have been tripped. If at least one circuit breaker is tripped, method 400 proceeds to method 600 shown in FIG. 6.

If no circuit breakers are tripped, the method continues to 418 to confirm if the voltage at the power interface is at or above the first threshold. If the voltage does not at least reach the first threshold, the method returns to 414 to continue disconnecting loads according to priority ranking. If the voltage is at least equal to the first threshold, the method continues to 502 of method 500 shown in FIG. 5.

Turning now to FIG. 5, at 502, the method includes receiving notification that disconnected electrical loads are to be reconnected and restarted. When the voltage reaches the first threshold, the tripped circuit breaker(s) may be automatically closed. The disconnected loads may be restarted according to priority ranking. For example, a highest ranking disconnected device may be restarted first, followed by sequentially lower ranking auxiliary devices. However, closing of the circuit breaker(s) and restarting of the auxiliary devices may be slightly delayed by a predetermined period of time to allow the PCM to prepare for the impending restart of disconnected auxiliary devices and to allow overheated auxiliary devices to cool.

At 504, prior to restarting the devices, the method determines if an estimated constant current load or surge load for one or more loads to be reconnected is greater than a second threshold. The second threshold may be a current level at which circuit breakers of the power interface may be tripped to circumvent overloading of the power interface. If the estimated load is not anticipated to surpass the second threshold, the method proceeds to 506 to adjust engine operations. For example, the PCM may consult a look up table providing a relationship between fuel combustion and a field current supplied by the ISG. The look up table may be used by the PCM to assess suitable adjustments to fuel combustion to compensate for changes in current load due to restarting of the electrical loads. The PCM may send instructions to display a message on the mobile phone indicating that the loads are reconnecting. The method then returns to 402 of method 400.

If the estimated constant current or surge load is anticipated to exceed the second threshold, the method proceeds to 508 to determine if the disconnected loads to be restarted are ranked at higher priority than the currently connected loads. For example, if two loads are to be reconnected and restarted, each load may be ranked against loads already plugged into the power panel and operating continuously. The priority ranking, as described above, may selected and customized by the operator.

If the new load(s) is determined to be higher in priority than the existing loads, restarting of the new load(s) may not be supported by an allowed current draw at the power interface and the method continues to 510 to abort restarting of the disconnected auxiliary devices. The operator may be alerted of the aborted restart by a message displayed on the mobile phone. The method then returns to 402 of method 400.

If the new load(s) is not determined to be higher in priority than the existing loads, the method proceeds to 512 to disconnect electrical loads according to priority ranking. For example, as described above, the loads may be disconnected beginning with the lowest ranking load and continue with sequentially higher ranking loads. Disconnection of loads may proceed until enough current is available for an inferred inrush current anticipated when the higher priority load(s) is restarted. The PCM may consult the look up table providing the relationship between fuel combustion and a field current supplied by the ISG, as described above. The look up table may be used by the PCM to assess suitable adjustments to fuel combustion to compensate for changes in current load due to restarting of the loads. The voltage at the power interface may be increased prior to reconnection of the loads to reduce voltage drops. The PCM may send instructions to display a message on the mobile phone indicating which loads are disconnected and which loads are restarting. At 514, changes to the loads imposed on the ISG are displayed on the mobile phone. The method then returns to method 400.

Turning now to FIG. 6, method 600 shows a method for resetting tripped circuit breakers of the power interface. When one or more circuit breakers are tripped, requests for breaker reset may be automatically sent to the PCM from each of the electrically disconnected loads. Continuing from 416 of method 400, at 602, method 600 includes estimating a current shortfall at the power interface. The current shortfall may be a difference between a maximum allowable current at one or more outlets of the power interface, above which circuit breakers are tripped, and a current load imposed by one or more loads coupled to the outlets.

The method includes determining at 604 if a highest ranked priority load of the disconnected loads (e.g., disconnected due to tripped circuit breakers) imposes an anticipated current load that is less than the first threshold. The first threshold may be the maximum allowable current described above, defining a boundary level of current flow below which power is not disconnected from loads. The PCM may refer to a look up table listing identified loads according to priority ranking as well as expected current draws specific to each of the loads.

If the current drawn by the disconnected highest priority load is not lower than the first threshold, the method continues to 606 to notify the operator of an aborted restart, e.g., by displaying a message on the mobile device. A load of the disconnected loads is identified with a priority ranking immediately below the previous highest priority load. The PCM may consult the look up table listing ranked loads to determine the next highest priority load. The method returns to 604 to determine if the current draw of the next highest priority load is less that the first threshold. As multiple circuit breakers may be tripped, the method may continue comparing current draws of sequentially lower priority ordered loads until a load with a current draw below the first threshold is identified.

If the load with the highest priority ranking of the disconnected loads is determined to draw an amount of current lower than the first threshold, the method proceeds to 608 to estimate changes to fuel consumption and generator field current due to restarting of the load. The PCM may consult a look up table listing anticipated changes to fuel usage and field current according to load and adjust engine operations based on the anticipated changes. For example, fuel injection rates may be increased, voltage at the power interface may be raised, and/or other electrical loads on the ISG may be temporarily reduced or paused to compensate for an expected increase in power draw associated with restarting of the load. A predetermined amount of waiting time, such as 2, 3, or 5 minutes, for example, may be allowed to elapse after adjustments to engine operations are made. After the waiting time passes, the method continues to close and reconnect the circuit breaker at 610. The method then returns to method 400.

Figure 7:
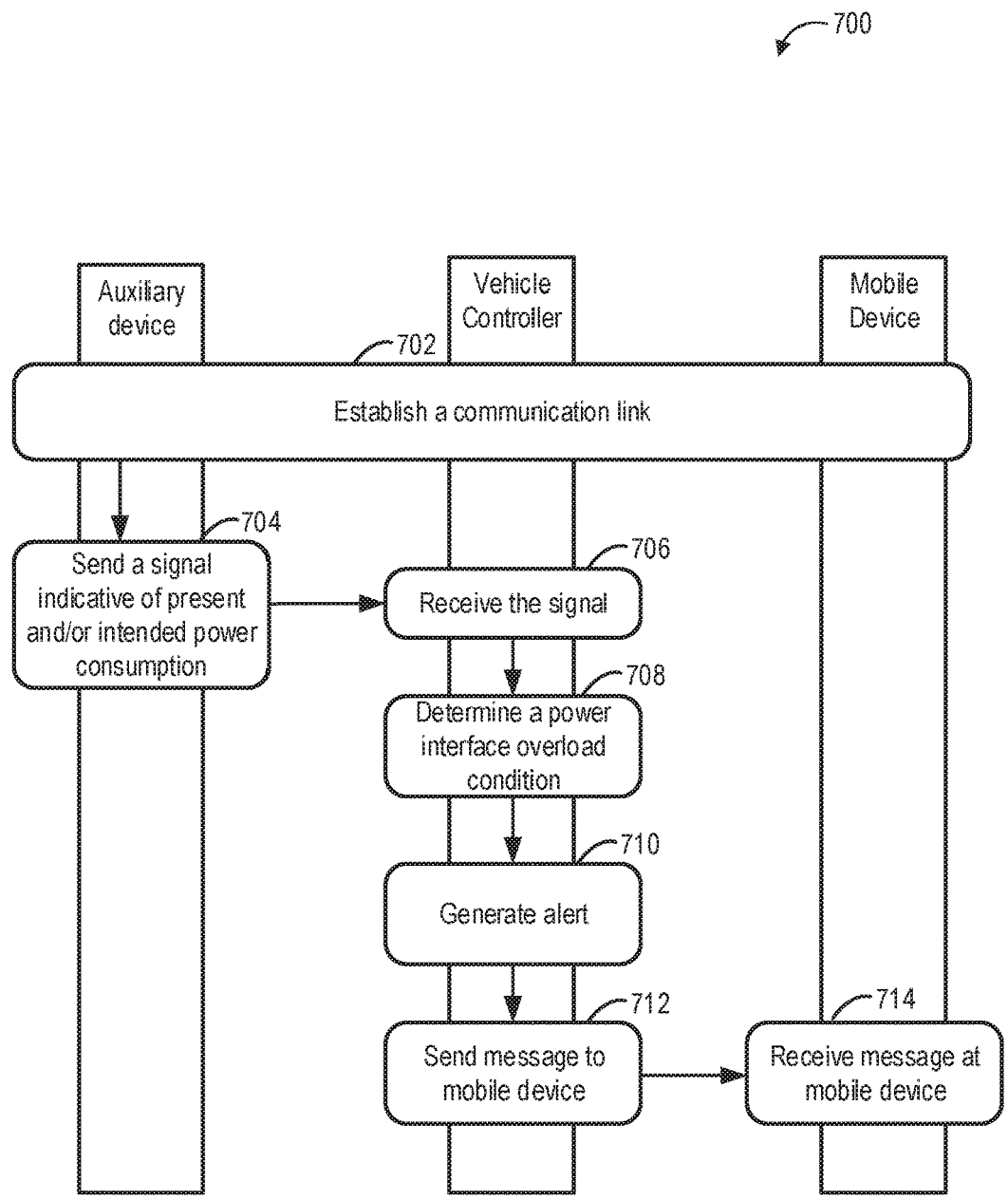
FIG. 7 shows an example of a flowchart illustrating a flow of communication via a communication link in a vehicle.

As described above, a communication link between components such as a vehicle controller, a power interface and/or auxiliary device coupled to the power interface, and external devices such as mobile devices allows the components to communicate with one another and provide visual and audio notifications to an operator. A flowchart 700 is depicted in FIG. 7 illustrating communication flow when one or more circuit breakers of the power interface are tripped due to current overload. Communicative actions may implemented at an auxiliary device, a vehicle controller (e.g., an ISG), and a mobile device.

At 702, the communication flow includes establishing a communication link, for example via a BLE network, between the components. The auxiliary device, at 704, sends a signal that indicates how much power is presently being consumed or expected to be consumed by the auxiliary device. The vehicle controller receives the signal at 706 and determines whether an overload condition is impending at the power interface at 708. An overload condition may be a condition where the present and/or expected voltage draw from the interface is currently or expected to surpass a threshold value (e.g., breaker tripping value). Upon determination of an overload condition at the power interface, the vehicle controller generates an alert at 710. The alert may be indicative of the occurrence or expected occurrence of a power interface overload condition. Additionally, the alert may include information about estimated auxiliary device run time based on loads at a generator supplying power to the auxiliary device, anticipated changes in engine temperature or fuel consumption resulting from the current overload, and/or magnitude of a current shortfall at the power interface. The alert is sent via the communication link to the mobile device at 712. At 714, the mobile device receives the alert and displays a message to notify an operator of the overload condition. It will be appreciated that another alert may be generated by the vehicle and/or sent to the mobile device when the circuit breaker is reset.

Figure 8:
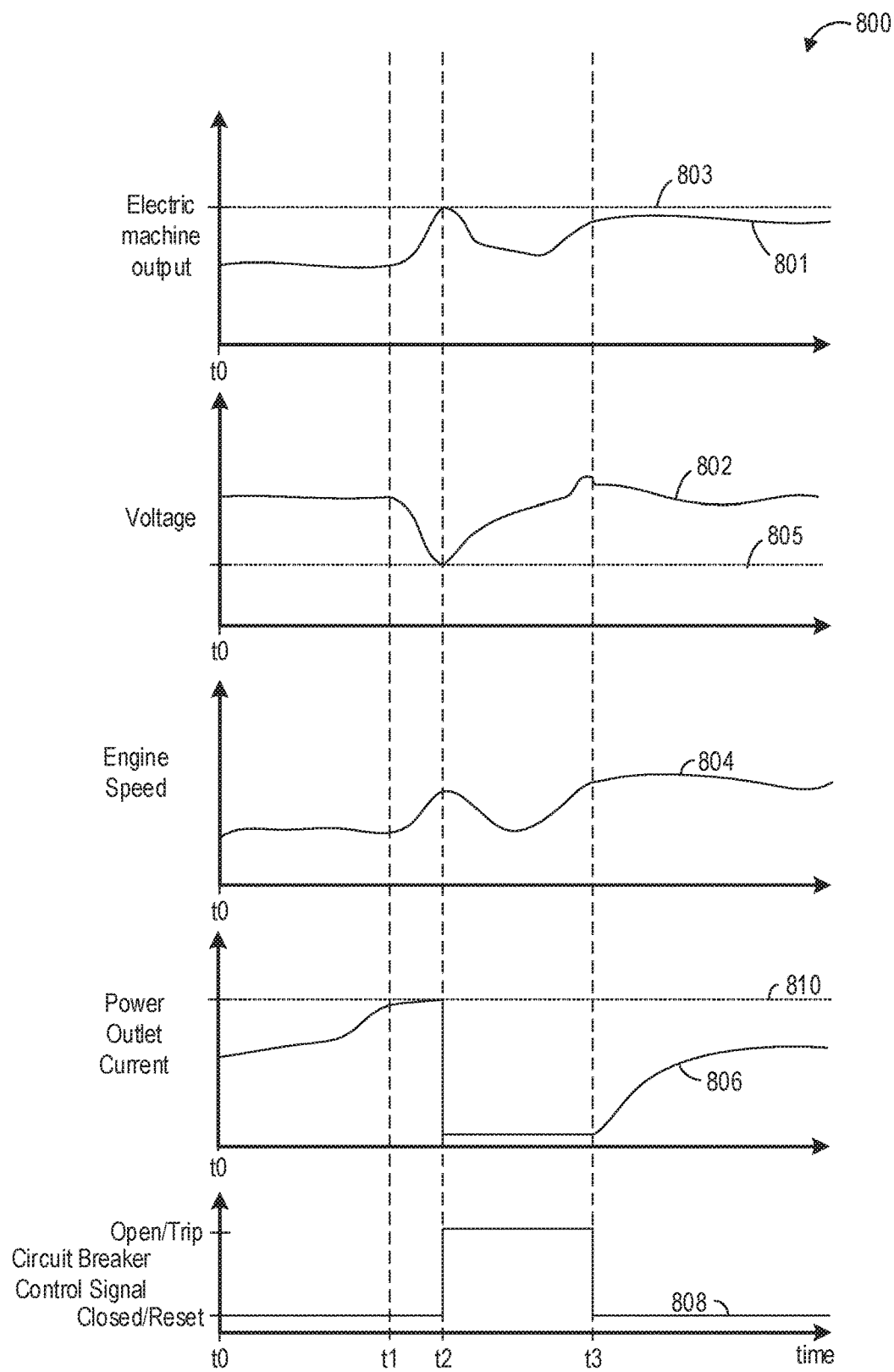
FIG. 8 shows example operations of a vehicle while the vehicle is parked and powering an auxiliary device.

Adjustments to engine operations in a vehicle in response to current stall at an auxiliary device, resulting from power interface overload, are depicted in a map 800 in FIG. 8. The vehicle may be vehicle 10 of FIG. 1, adapted with an ISG and power interface with power outlets, such as the ISG 202 and plurality of power outlets 214 of FIG. 2. One or more auxiliary devices may be coupled to the power outlets. Time is plotted along the x-axis and increasing from left to right. Engine and electrical circuit conditions are plotted increasing upwards along the y-axis including power output of an electric machine (e.g., the ISG) at plot 801, voltage at the power interface at plot 802, engine speed at plot 804, and current at one of the power outlets of the power interface at plot 806 (with an auxiliary device plugged into the power outlet). A circuit breaker control signal, which may be displayed on a mobile device for example, is depicted at plot 808 and alternates between reset and trip commands along the y-axis.

At t0, the engine is operating in a parked mode. The power outlet current is rising but below the third threshold 810. Additionally, from t0 to t2, the circuit breaker is in the reset position, closing the circuit and allowing current to flow to the auxiliary device coupled to the power outlet. The voltage, engine speed, and electric machine output are relatively uniform between t0 and t1.

At t1 the controller determines that the power interface is expected to experience an overcurrent condition based on an increase in electric machine output and/or a decrease in voltage. For example, a motor of the auxiliary device may begin to stall as the electric machine output approaches a first threshold 803, the first threshold 803 defining a maximum allowable level of power generation at the electric machine. Additionally or alternatively, a voltage sag approaching a second threshold 805 may be detected, the second threshold 805 corresponding to auxiliary device stall. Responsive to anticipation of power interface overload, the PCM may refer to a priority ranking of electrical loads coupled to the power interface and identify a lowest ranking load. Plot 806 may represent a power outlet current at a power outlet supplying power to the lowest ranking load. The priority ranking may be selected by an operator, allowing the operator to prioritize continuous operation of specific loads.

The power outlet current reaches the third threshold 810 at t2, the third threshold 810 a current level that triggers tripping of a circuit breaker of the power outlet. Concurrently, the electric machine output reaches the first threshold 803 and the voltage drops to the second threshold 805. Responsive to the power outlet current reaching the third threshold 810, the circuit breaker is tripped, cutting power to the lowest ranked load according to priority. Thus, current flow at the power outlet stops at t2. Cutting power to the lowest ranked load decreases the electric machine output below the first threshold 803 and allows the voltage to rise above the second threshold 805.

Between t2 and t3, the voltage at the power outlet may be increased to reduce the chance of (e.g., prevent) voltage sags occurring when the breaker is reset. Additionally, the engine speed increases between t2 and t3 in anticipation of an increased load when the circuit breaker is reset and the lowest priority load restarts. At t3, the circuit breaker is closed and the lowest priority load is subsequently reactivated. Consequently the circuit breaker is efficiently reset.

The systems and methods described herein allow an ISG to supply power to auxiliary devices coupled to a power interface of a vehicle. The vehicle's controller, the auxiliary devices, and the power interface may be adapted with a communication link that allows information regarding operating status and electrical condition to be relayed to the controller. The controller may utilize the data to adjust voltage and current flow, as well as engine operations, through the power interface in response to power demand and supply at the power interface. The communication link enables suppression of voltage spikes and sags and allows circuit breakers of the power interface to be automatically reset when tripped, if desired. Engine operations may be moderated to offset the increased loading imposed on the electrical system during restarting of the auxiliary device coupled to the tripped circuit breaker(s). As a result, voltage spikes that may otherwise degrade electrical components of the vehicle are dampened and an efficiency of power provision to the auxiliary devices is increased by reducing an amount of time spent on resetting circuit breakers and restarting the stalled auxiliary devices. Interruptions to auxiliary device operation may therefore occur less frequently. Furthermore, an operator may be alerted of current auxiliary device and electrical system statuses via the communication link, enabling messages to be displayed at a mobile device and/or visual or audio vehicle signals. Providing actionable data related to the electrical system in the vehicle to a user allows the user to modify their use of the system to more effectively operate the auxiliary devices.

The technical effect of adapting a vehicle electrical system with a communication link is the regulation of power distribution among electrical components to decrease oscillations in voltage that can cause damage to electrical system components and allows for more continuous and efficient operation of auxiliary devices to be maintained.

The invention will be further described in the following paragraphs. In one embodiment, a method includes at a controller, establishing a communication link between the controller and an auxiliary device electrically coupled to a power interface of the vehicle, receiving a signal from the auxiliary device indicative of a present and/or anticipated power consumption of the auxiliary device, and regulating power supplied to the auxiliary device through the power interface based on the signal indicative of the present and/or anticipated power consumption. In a first example of the method, implementing an overload mitigation mode responsive to predicting a power interface overload condition based on the signal indicative of the present and/or anticipated power consumption of the auxiliary device. A second example of the method optionally includes the first example, and further includes, wherein implementing the overload mitigation mode includes triggering an overload indicator in the vehicle system, and sending an overload alert to a mobile device. A third example of the method optionally includes one or more of the first and second examples, and further includes, wherein implementing the overload mitigation mode includes shutting down one or more outlets in the power interface based on predetermined priorities of a plurality of auxiliary devices electrically coupled to a plurality of power outlets in the power interface. A fourth example of the method optionally includes one or more of the first through third examples, and further includes, wherein implementing the overload mitigation mode includes reducing a generator field current in an electric machine of a powertrain of the vehicle, the electric machine supplying power to the power interface and tripping a circuit breaker in the power interface. A fifth example of the method optionally includes one or more of the first through fourth examples, and further includes, subsequent to the implementation of the overload mitigation mode, resetting the circuit breaker in the power interface. A sixth example of the method optionally includes one or more of the first through fifth examples, and further includes, wherein resetting the circuit breaker includes increasing a voltage at the power interface by a predetermined amount and increasing a fuel injection quantity in the internal combustion engine. A seventh example of the method optionally includes one or more of the first through sixth examples, and further includes, wherein resetting the circuit breaker includes waiting a predetermined time and resuming a current flow to the auxiliary device. An eighth example of the method optionally includes one or more of the first through seventh examples, and further includes, wherein the circuit breaker is reset responsive to receiving a breaker reset request from the auxiliary device. An ninth example of the method optionally includes one or more of the first through eighth examples, and further includes, sending a power interface state message to a mobile device based on the signal indicative of the present and/or anticipated power consumption of the auxiliary device. A tenth example of the method optionally includes one or more of the first through ninth examples, and further includes, prior to sending the power interface state message to the mobile device, predicting engine temperature increase based on the signal indicative of the present and/or anticipated power consumption and wherein the power interface state message includes an overheat alert message. An eleventh example of the method optionally includes one or more of the first through tenth examples, and further includes, wherein the power consumption message includes one or more of a current power consumption of the auxiliary device, an expected runtime of the auxiliary device, engine cooling system data, and a predicted temperature rise of the internal combustion engine.

In another embodiment, a method for operating a vehicle system with an internal combustion engine coupled to an electric machine is provided. The method includes, at a controller, establishing a wireless communication link between a controller and an auxiliary device electrically coupled to a power interface of the vehicle; receiving a signal from the auxiliary device indicative of an anticipated power consumption of the auxiliary device; regulating an amount of power supplied to the auxiliary device through the power interface by adjusting the internal combustion engine and/or the electric machine based on the signal indicative of the anticipated power consumption; determining a power interface overload condition; and tripping a circuit breaker in the power interface. In one example, the method may further includes subsequent to tripping the circuit breaker, increasing a voltage at the power interface by a predetermined amount, increasing a fuel injection quantity in the internal combustion engine, and resetting the circuit breaker in the power interface. In another example, the method may further include responsive to determining the power interface overload condition shutting down one or more outlets in the power interface based on predetermined priorities of auxiliary devices electrically coupled to the corresponding power outlet. In yet another example, the method may further include in response to determining the power interface overload condition, triggering an overload indicator in the vehicle system and sending an overload alert to a mobile device.

In another embodiment, a vehicle system includes an external power interface including a power outlet receiving electrical energy from an electric machine coupled to an internal combustion engine when the vehicle is stationary, a controller with computer readable instructions stored on non-transitory memory that when executed cause the controller to, establish a wireless communication link with an auxiliary device electrically coupled to the power outlet, receive a wireless signal from the auxiliary device indicative of an anticipated power consumption of the auxiliary device, and regulate an amount of power supplied to the auxiliary device through the power interface based on the signal indicative of the anticipated power consumption.

In any of the embodiments or combinations of the embodiments, the controller may further include computer readable instructions stored on the non-transitory memory that when executed cause the controller to implement an overload mitigation mode responsive to predicting a power interface overcurrent condition based on the signal indicative of the anticipated power consumption of the auxiliary device, wherein implementing the overload mitigation mode includes one or more of triggering an overload indicator in the vehicle system, sending an overload alert to an operator mobile device, and reducing a generator field current in an electric machine supplying power to the power interface and tripping a circuit breaker in the power interface.

In any of the embodiments or combinations of the embodiments, the controller may further include computer readable instructions stored on the non-transitory memory that when executed cause the controller to: subsequent to implementation of the overload mitigation mode, increase a voltage at the power interface by a predetermined amount, increase a fuel injection quantity in the internal combustion engine, and reset the circuit breaker in the power interface.

In any of the embodiments or combinations of the embodiments, the controller may further include computer readable instructions stored on the non-transitory memory that when executed cause the controller to: in response to predicting a power interface overload condition based on the signal indicative of the anticipated power consumption of the auxiliary device, shut down one or more outlets in the power interface based on predetermined priorities of a plurality of auxiliary devices electrically coupled to a plurality of power outlets in the power interface.

In yet another embodiment, a method includes at a controller, establishing a wireless communication link between a controller and an auxiliary device electrically coupled to a power interface of the vehicle, receiving a signal from the auxiliary device indicative of an anticipated power consumption of the auxiliary device, regulating an amount of power supplied to the auxiliary device through the power interface by adjusting the internal combustion engine and/or the electric machine based on the signal indicative of the anticipated power consumption, determining a power interface overload condition, and tripping a circuit breaker in the power interface. In a first example of the method, subsequent to tripping the circuit breaker, increasing a voltage at the power interface by a predetermined amount, increasing a fuel injection quantity in the internal combustion engine, and resetting the circuit breaker in the power interface. A second example of the method optionally includes the first example, and further includes, responsive to determining the expected occurrence of a power interface overload condition shutting down one or more outlets in the power interface based on predetermined priorities of auxiliary devices electrically coupled to the corresponding power outlet. A third example of the method optionally includes one or more of the first and second examples, and further includes, in response to predicting the power interface overload condition, triggering an overload indicator in the vehicle system and sending an overload alert to a mobile device.

In any of the embodiments or combinations of the embodiments, the controller includes a power-train control module (PCM) sending control commands to a fuel delivery system during vehicle operation.

In any of the embodiments or combinations of the embodiments, the communication link may be a wireless communication link.

In any of the embodiments or combinations of the embodiments, the vehicle system may be included in a hybrid vehicle.

In another representation, a method for operating a vehicle system is provided that includes predicting an overload condition based on a wireless communication exchange between an auxiliary device receiving power from an electric machine coupled to an internal combustion engine while the vehicle system is stationary; tripping a breaker in a power interface electrically connecting the auxiliary device to the electric machine; and adjusting combustion engine and/or electric machine operating prior to or while the breaker is tripped.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle system with an internal combustion engine, comprising:
   at a controller, establishing a communication link between the controller and an auxiliary device electrically coupled to a power interface of a vehicle;
   receiving a signal from the auxiliary device indicative of a present and/or anticipated power consumption of the auxiliary device; and
   regulating power supplied to the auxiliary device through the power interface based on the signal indicative of the present and/or anticipated power consumption,
   wherein power is regulated by increasing a fuel injection quantity in the internal combustion engine.

2. The method of claim 1, further comprising implementing an overload mitigation mode responsive to determining a power interface overload condition based on the signal indicative of the present and/or anticipated power consumption of the auxiliary device.

3. The method of claim 2, wherein implementing the overload mitigation mode includes:
   triggering an overload indicator in the vehicle system; and
   sending an overload alert to a mobile device.

4. The method of claim 2, wherein implementing the overload mitigation mode includes shutting down one or more outlets in the power interface based on predetermined priorities of a plurality of auxiliary devices electrically coupled to a plurality of power outlets in the power interface.

5. The method of claim 2, wherein implementing the overload mitigation mode includes reducing a generator field current in an electric machine of a powertrain of the vehicle, the electric machine supplying power to the power interface and tripping a circuit breaker in the power interface.

6. The method of claim 5, further comprising, subsequent to the implementation of the overload mitigation mode, resetting the circuit breaker in the power interface.

7. The method of claim 6, wherein resetting the circuit breaker includes increasing a voltage at the power interface by a predetermined amount.

8. The method of claim 6, wherein resetting the circuit breaker includes waiting a predetermined time and resuming a current flow to the auxiliary device.

9. The method of claim 6, wherein the circuit breaker is reset responsive to receiving a breaker reset request from the auxiliary device.

10. The method of claim 1, further comprising sending a power interface state message to a mobile device based on the signal indicative of the present and/or anticipated power consumption of the auxiliary device.

11. The method of claim 10, further comprising, prior to sending the power interface state message to the mobile device, predicting an engine temperature increase based on the signal indicative of the present and/or anticipated power consumption of the auxiliary device and wherein the power interface state message includes an overheat alert message.

12. The method of claim 10, wherein the power interface state message includes one or more of a current power consumption of the auxiliary device, an expected runtime of the auxiliary device, engine cooling system data, and a predicted temperature rise of the internal combustion engine.

13. A vehicle system, comprising:
an external power interface including a power outlet receiving electrical energy from an electric machine coupled to an internal combustion engine when a vehicle is stationary;
a controller with computer readable instructions stored on non-transitory memory that when executed cause the controller to:
establish a wireless communication link with an auxiliary device electrically coupled to the power outlet;
receive a wireless signal from the auxiliary device indicative of a present and/or anticipated power consumption of the auxiliary device; and
regulate an amount of power supplied to the auxiliary device through the power interface based on the signal indicative of the present and/or anticipated power consumption of the auxiliary device,
wherein power is regulated by increasing a fuel injection quantity in the internal combustion engine.

14. The vehicle system of claim 13, wherein the controller further includes computer readable instructions stored on the non-transitory memory that when executed cause the controller to:
implement an overload mitigation mode responsive to predicting a power interface overload condition based on the signal indicative of the present and/or anticipated power consumption of the auxiliary device;
wherein implementing the overload mitigation mode includes one or more of:
triggering an overload indicator in the vehicle system; and
sending an overload alert to an operator mobile device.

15. The vehicle system of claim 14, wherein the controller further includes computer readable instructions stored on the non-transitory memory that when executed cause the controller to: subsequent to implementation of the overload mitigation mode, increase a voltage at the power interface by a predetermined amount and reset a circuit breaker in the power interface.

16. The vehicle system of claim 13, wherein the controller further includes computer readable instructions stored on the non-transitory memory that when executed cause the controller to:
in response to predicting a power interface overload condition based on the signal indicative of the present and/or anticipated power consumption of the auxiliary device, shut down one or more outlets in the power interface based on predetermined priorities of a plurality of auxiliary devices electrically coupled to a plurality of power outlets in the power interface.

17. A method for operating a vehicle system with an internal combustion engine coupled to an electric machine, comprising:
at a controller, establishing a wireless communication link between a controller and an auxiliary device electrically coupled to a power interface of a vehicle;
receiving a signal from the auxiliary device indicative of an anticipated power consumption of the auxiliary device;
regulating an amount of power supplied to the auxiliary device through the power interface by adjusting the internal combustion engine and/or the electric machine based on the signal indicative of the anticipated power consumption of the auxiliary device, wherein power is regulated by increasing a fuel injection quantity in the internal combustion engine;
determining a power interface overload condition; and
tripping a circuit breaker in the power interface.

18. The method of claim 17, further comprising, subsequent to tripping the circuit breaker, increasing a voltage at the power interface by a predetermined amount and resetting the circuit breaker in the power interface.

19. The method of claim 17, further comprising, responsive to determining the power interface overload condition, shutting down one or more outlets in the power interface based on predetermined priorities of auxiliary devices electrically coupled to a corresponding power outlet.

20. The method of claim 17, further comprising, in response to determining the power interface overload condition, triggering an overload indicator in the vehicle system and sending an overload alert to a mobile device.

* * * * *